S. B. CLAY.
MACHINE FOR THREADING BOLTS AND PIPES.
APPLICATION FILED FEB. 2, 1920.
1,381,542.
Patented June 14, 1921.
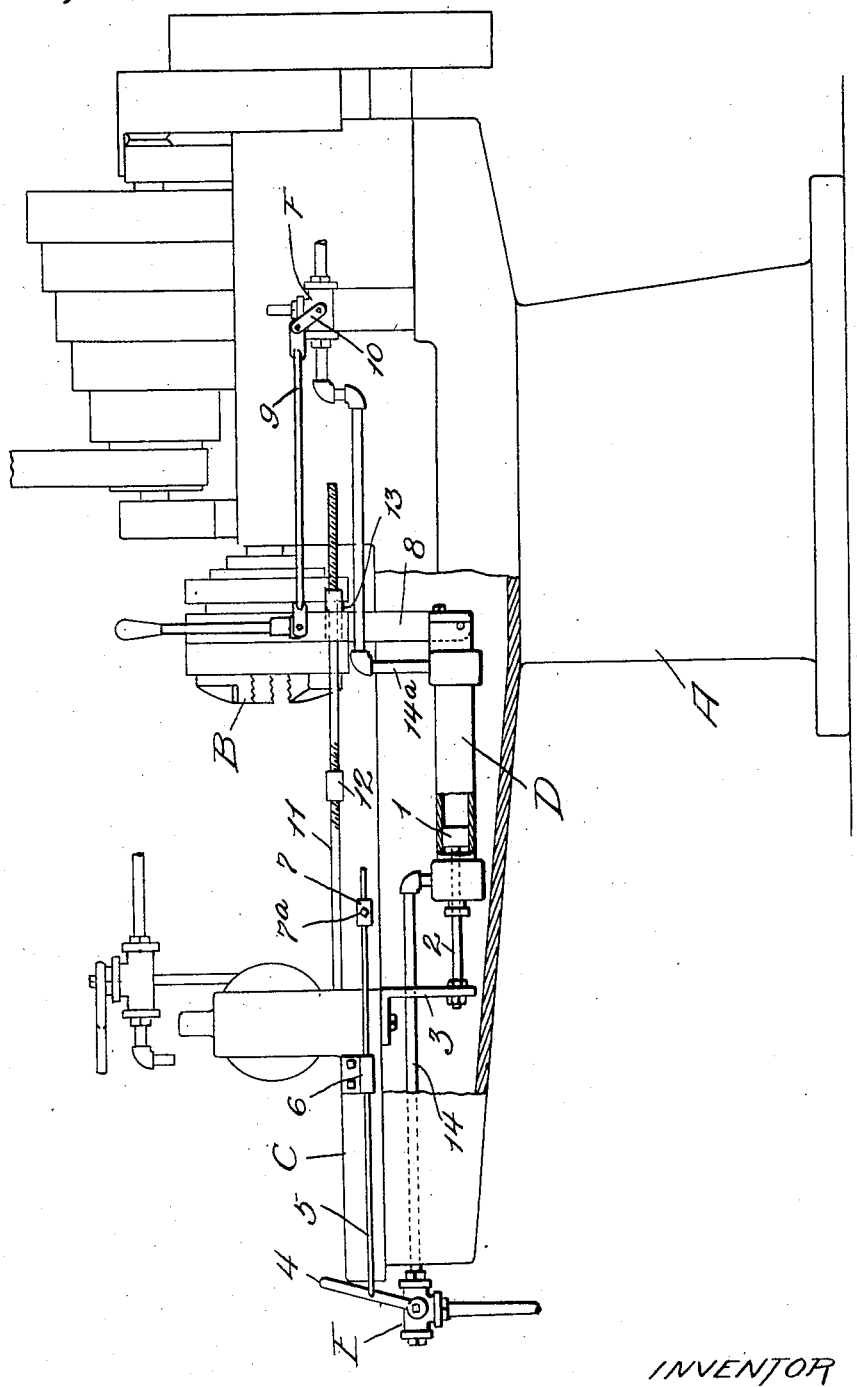
INVENTOR
SAMUEL B. CLAY,
by Bakewell & Cline, ATTORNEYS

UNITED STATES PATENT OFFICE.

SAMUEL B. CLAY, OF ST. LOUIS, MISSOURI, ASSIGNOR OF ONE-HALF TO EDWARD R. FISH, OF WEBSTER GROVES, MISSOURI.

MACHINE FOR THREADING BOLTS AND PIPES.

1,381,542.  Specification of Letters Patent.  Patented June 14, 1921.

Application filed February 2, 1920. Serial No. 355,703.

*To all whom it may concern:*

Be it known that I, SAMUEL B. CLAY, a citizen of the United States, residing at St. Louis, Missouri, have invented a certain new and useful Improvement in Machines for Threading Bolts and Pipes, of which the following is a full, clear, and exact description, such as will enable others skilled in the art to which it appertains to make and use the same This invention relates to machines of the character that are used for threading bolts and pipes.

The main object of my present invention is to provide means for increasing the efficiency and speed of operation of a bolt or pipe threading machine of the type in which an operating medium such as a hydraulic medium or a medium under pressure is used for causing the work to be engaged by the threading mechanism and for separating the threading mechanism from the work without speeding up the machine or increasing the speed of the drive shaft, and without changing the chasers of the threading mechanism.

To this end I have devised a threading machine in which the supply of the operating medium that effects the movement of one main element of the machine toward the other main element; for example, the carriage toward the threading mechanism is automatically cut off after the article being threaded has been engaged by the threading mechanism and the supply of the operating medium that effects the return of the carriage to starting position is automatically turned on at the completion of the threading operation so as to cause the carriage to return to starting position, and is cut off automatically when the carriage reaches its starting position.

A machine of the above construction is practically automatic in its operation, for after the supply of the operating medium has been turned on by the operator in charge of the machine, so as to cause one of the main elements of the machine to start to move toward the other main element, nothing further is required of the operator during the remainder of the cycle of the machine.

The figure of the drawings is a side elevational view of a machine constructed in accordance with my invention wherein the work is carried by a carriage that moves toward and away from the threading mechanism. I wish it to be understood, however, that it is immaterial, so far as my broad idea is concerned, which main element of the machine is movable toward and away from the other main element, so long as the work can be engaged by and separated from the threading machine.

Referring to the drawings, A designates the base of the machine. B designates the threading mechanism, and C designates the carriage on which the bolt or pipe to be threaded is mounted and clamped in any preferred manner, the machine herein illustrated being equipped with a clamping means of the character described in my pending application Serial No. 333,593, filed October 27, 1919.

In the form of my invention herein illustrated a single operating cylinder D is provided for moving the carriage C toward and away from the threading mechanism B, but I wish it to be understood that it is immaterial, so far as my broad idea is concerned, what particular type of hydraulic or pneumatic means is employed for moving the carriage C in opposite directions. In the machine herein illustrated the piston 1 of the operating cylinder D is connected to the carriage C by means of a rod 2 whose front end is attached to an arm 3 that projects downwardly from the carriage. Compressed air or any other suitable operating medium is admitted to and exhausted from the cylinder D to effect the movement of the carriage C toward the threading mechanism by means of a three-way valve E arranged at the front end of the machine and provided with a handle 4 that is adapted to be moved manually by the operator toward the left so as to turn on the supply of the operating medium or cause said operating medium to be admitted to the front end (the left hand end) of the cylinder D. As soon as the supply of the operating medium has been turned on in the manner just described, the carriage C starts to move to the right toward the threading mechanism B, and when the article on said carriage which is to be threaded is engaged by the threading mechanism B, the valve E is actuated automatically so as to cut off the supply of the operating medium to the cylinder D and also exhaust the operating medium previously admitted to said cylinder. Various means can be employed for actuating the valve E automatically so as to cut off the supply of the operating medium in the manner just described, but I prefer to connect the handle 4 of said valve to a rod 5 that passes through a guide 6 on the carriage C and which is provided at its right hand end with a stop 7 that is adapted to be engaged by the guide 6 when the carriage C reaches a certain position in its travel toward the threading mechanism, the movement imparted to the rod 5 by the guide 6 on the carriage causing the stem of the valve E to be moved into such a position that the supply of the operating medium to the cylinder D will be cut off and the operating medium previously admitted to the cylinder permitted to exhaust from said cylinder after the article on the carriage has been brought into operative relationship with the threading mechanism. The stop 7 is preferably adjustably connected to the rod 5, as for example, by means of a set screw 7$^a$, so as to permit the automatic tripping or closing of the valve E to be accurately regulated.

The machine is also equipped with a three-way valve F, and means for automatically opening said valve at the completion of the threading operation, thus causing the carriage C to return to its starting position, and for closing said valve automatically when the carriage reaches its starting position. The mechanism employed in the machine herein illustrated for automatically opening and closing the valve F consists of a rock arm or lever 8 that is connected by means of a link 9 with an arm 10 on the stem of the valve F, and a rod 11 connected to the carriage C and provided with tripping devices 12 and 13 that engage and move the rock arm 8 at certain points in the cycle of operations of the carriage C, namely, when the carriage is approaching the end of its stroke to the right, and when the carriage is approaching the end of its stroke to the left, or, in other words, shortly before it reaches its starting position.

After the bolt, rod, or other article to be threaded has been clamped in operative position on the carriage C the operator in charge of the machine actuates the valve E so as to admit the operating medium to the front end of the cylinder D through the supply pipe 14, thereby causing the carriage C to start to move toward the threading mechanism B. At a certain point in the stroke of the carriage, namely, after the article thereon has been engaged by the threading mechanism B, the coöperation of the guide 6 on the carriage with the stop 7 on the rod 5 causes the valve E to close and cut off the supply of the operating medium which effected the movement of the carriage toward the threading mechanism. Thereafter, the carriage continues to move to the right, due to the pull that is exerted on same by the engagement of the threading mechanism with the article on the carriage that is being threaded. At a certain point in the movement of the carriage to the right, the tripping device 12 on the rod 11 engages the rock arm 8 and moves it in a direction to cause the valve F to open at the termination of the threading operation, thereby causing the operating medium to be admitted to the rear end of the cylinder D through the supply pipe 14$^a$, and thus causing the piston 1 in said cylinder to move forwardly or in a direction to return the carriage C to its starting position. Just before the carriage reaches its starting position the tripping device 13 on the rod 11 engages the rock arm 8 and moves it in a direction to cause the valve F to close as soon as the carriage reaches its starting position, the operating medium that was previously admitted to the rear end of the cylinder D escaping from said cylinder as soon as the valve F closes. The tripping devices 12 and 13 on the rod 11 are preferably adjustably connected to same, so as to enable the return stroke of the carriage C to be accurately controlled, the tripping devices herein illustrated being adjustably mounted on screw-threaded portions of the rod 11, as indicated in the drawing.

A mechanism of the character above described for effecting and governing the operation of the reciprocating element of a threading machine materially increases the efficiency and speed of operation of the machine and practically makes the machine automatic in its operation, for after the operator in charge of the machine has actuated a valve to turn on the supply of the operating medium that causes said reciprocating element to move toward the other main element of the machine, nothing further is required of the operator during the remainder of the cycle of the carriage.

Having thus described my invention, what I claim as new and desire to secure by Letters Patent, is:

1. A threading machine, comprising a threading mechanism, a carriage that carries the article to be threaded, means adapted to be operated by a medium under pressure for moving the carriage toward said threading mechanism, and means for automatically cutting off the supply of the operating medium to said means after the article on the carriage has been engaged by said threading mechanism.

2. A threading machine, comprising a threading mechanism, a carriage that carries the article to be threaded, means adapted to be operated by a medium under pressure for moving the carriage toward said threading mechanism, and means for rendering said carriage moving means inoperative automatically after the article on the carriage has been engaged by the threading mechanism.

3. A threading machine, comprising a threading mechanism, a part that carries the work, means adapted to be operated by a medium under pressure for arranging the work in position to be engaged by said threading mechanism, and means for automatically cutting off the supply of the operating medium to said means after the work has been engaged by said threading mechanism.

4. In a threading machine of the type in which the carriage is moved toward the threading mechanism by a means operated by a medium under pressure, a valve for controlling said operating medium, and means for automatically closing said valve after the carriage reaches such a position that the article thereon is in operative relationship with the threading mechanism.

5. In a threading machine of the type in which the carriage is moved toward the threading mechanism by a means operated by a medium under pressure, a valve for controlling said operating medium, and means operated by the movement of the carriage for closing said valve so as to cut off the supply of the operating medium when the threading mechanism starts to operate on the article mounted on the carriage.

6. In a threading machine of the type in which the carriage is moved toward the threading mechanism by a means operated by a medium under pressure, a valve for controlling said operating medium, an operating device connected to said valve, and means on the carriage for actuating said operating device when the carriage reaches a certain position in its travel toward the threading mechanism.

7. A threading machine, comprising a threading mechanism, a carriage for supporting the article to be threaded, means adapted to be operated by a medium under pressure for moving the carriage toward said threading mechanism, and an adjustable means that automatically renders said carriage moving means inoperative after the threading mechanism has started to act on the article supported by said carriage.

8. A threading machine, comprising a threading mechanism, a carriage that supports the article to be threaded, means adapted to be operated by a medium under pressure for moving the carriage toward said threading mechanism, a valve for controlling said operating medium, an automatic actuating mechanism for said valve consisting of a rod joined to the stem of said valve and provided with a stop, and a device on the carriage that engages said stop during the movement of the carriage toward said threading mechanism.

9. A threading machine, comprising a threading mechanism, a part for supporting the article to be threaded, a member that is adapted to be moved in one direction by a medium under pressure so as to arrange said article in position to be engaged by said threading mechanism, means for automatically cutting off the supply of the operating medium that moves said member after the article has been engaged by said threading mechanism, and means for automatically supplying an operating medium to said member at the termination of the threading operation so as to move said member in the opposite direction and thus separate said article and threading mechanism.

10. A threading machine, comprising a threading mechanism, a carriage for supporting the article to be threaded, means adapted to be operated by a medium under pressure for moving the carriage toward and away from said mechanism, two valves for governing the medium that operates said means, means for actuating one of said valves automatically so as to cut off the supply of the operating medium during the movement of the carriage toward said threading mechanism, and an independent means for actuating the other valve to effect the return of the carriage to its starting position at the completion of the threading operation.

11. A threading machine, comprising a threading mechanism, a carriage for supporting the article to be threaded, a cylinder provided with a piston that is connected to said carriage, a manually-operable valve for admitting a medium under pressure to one end of said cylinder so as to cause the carriage to move toward the threading mechanism, means for automatically moving said valve into such a position that said piston will be ineffective after the article on the carriage has been engaged by said threading mechanism, a second valve for admitting a medium under pressure to the opposite end of said cylinder, and means actuated by the carriage to cause said second valve to open automatically at the completion of the threading operation, thus causing the carriage to return to its starting position, and to close automatically when said carriage reaches its starting position.

SAMUEL B. CLAY.